(12) United States Patent
Briere et al.

(10) Patent No.: US 8,796,549 B2
(45) Date of Patent: Aug. 5, 2014

(54) WIRE BUSHING

(75) Inventors: Thomas A. Briere, North Richland Hills, TX (US); Steve Chap Tran, Mountain View, CA (US); Thomas Pieper Oliver, Garland, TX (US); John M. Kuster, San Jose, CA (US); David A. Hurrell, San Mateo, CA (US)

(73) Assignee: Tyco Electronics Corporation, Berwyn, PA (US)

( * ) Notice: Subject to any disclaimer, the term of this patent is extended or adjusted under 35 U.S.C. 154(b) by 498 days.

(21) Appl. No.: 13/019,967

(22) Filed: Feb. 2, 2011

(65) Prior Publication Data
US 2012/0193140 A1   Aug. 2, 2012

(51) Int. Cl.
*H01B 7/06* (2006.01)
*H01B 17/22* (2006.01)
*H01B 7/24* (2006.01)
*H02G 3/18* (2006.01)
*H02G 3/22* (2006.01)

(52) U.S. Cl.
CPC ........................................ *H02G 3/22* (2013.01)
USPC .............. 174/69; 174/108; 174/136; 174/650

(58) Field of Classification Search
USPC ............... 174/69, 108, 117 FF, 136, 251, 650
See application file for complete search history.

(56) References Cited

U.S. PATENT DOCUMENTS

| | | | | |
|---|---|---|---|---|
| 2,993,949 A * | 7/1961 | Moebius et al. | ........... | 174/124 R |
| 4,071,834 A * | 1/1978 | Comte | ........... | 333/242 |
| 4,197,348 A * | 4/1980 | Townsend | ...................... | 428/377 |
| 4,517,234 A * | 5/1985 | Fisher | ........................... | 428/119 |
| 4,788,089 A * | 11/1988 | Skipper | ........................ | 428/34.9 |
| 4,827,081 A * | 5/1989 | Seabourne et al. | ........... | 174/139 |
| 7,064,272 B2 * | 6/2006 | Auray et al. | .................. | 174/659 |
| 2005/0247480 A1* | 11/2005 | Schulz | ..................... | 174/117 FF |
| 2011/0275240 A1* | 11/2011 | Hsieh et al. | ................... | 439/502 |

* cited by examiner

*Primary Examiner* — Timothy Thompson
*Assistant Examiner* — Sherman Ng

(57) ABSTRACT

A bushing is provided for a wire. The bushing includes a polymeric body that extends a length from an end to an opposite end. The body includes a pre-coiled shape wherein the body includes at least one coil defined between the ends. The body is biased to the pre-coiled shape and is flexible such that the body is configured to be at least partially unwound from the pre-coiled shape, against the bias, for wrapping the body around the wire. The body is resiliently unwindable from the pre-coiled shape such that the body is configured to at least partially return to the pre-coiled shape as the body is wrapped around the wire.

19 Claims, 8 Drawing Sheets

US 8,796,549 B2

WIRE BUSHING

BACKGROUND OF THE INVENTION

The subject matter described and/or illustrated herein relates generally to wires, and more particularly, to a bushing for wires.

Some wires that are terminated to connector assemblies include shim members. The shim member extends between the wire(s) and a component of the connector assembly. For example, the connector assembly may include a connector and a clamp or other support member that mounts on a rear end of the connector. The wire(s) extend through an opening within the support member and into the connector for termination thereby. The shim member extends radially between an outer circumference of the wire(s) and a radially inner surface of the support member, for example to provide stress and/or strain relief to the wire(s).

A length of tape is often used as a shim member. The tape is wrapped around the wire(s) until the tape builds to a radial thickness that is sized to fill the radial gap between the outer circumference of the wire(s) and the radially inner surface of the support member. But, tape is typically relatively thin such that it takes a relatively large number of wraps around the wire(s), and thus a relatively long length of tape, to fill the radial gap. For example, it may take up to 40 wraps and six feet of tape to build the tape to a radial thickness that fills a radial gap of between approximately 0.020 inch (0.051 cm) and approximately 1.000 inch (2.540 cm). Applying the relatively large number of wraps around the wire(s) is time consuming and labor intensive. The relatively long length of tape required to fill the radial gap may also be relatively expensive. Moreover, the tape is typically not reusable because the multiple wraps of tape adhere to each other and the wire(s) after being wrapped. Disposing of the tape after only a single use may be expensive and may require stocking a relatively large inventory of tape.

BRIEF DESCRIPTION OF THE INVENTION

In one embodiment, a bushing is provided for a wire. The bushing includes a polymeric body that extends a length from an end to an opposite end. The body includes a pre-coiled shape wherein the body includes at least one coil defined between the ends. The body is biased to the pre-coiled shape and is flexible such that the body is configured to be at least partially unwound from the pre-coiled shape, against the bias, for wrapping the body around the wire. The body is resiliently unwindable from the pre-coiled shape such that the body is configured to at least partially return to the pre-coiled shape as the body is wrapped around the wire.

In another embodiment, a support assembly is provided for supporting a wire. The assembly includes a support member configured to support the wire, and a bushing having a polymeric body extending a length from an end to an opposite end. The body is configured to extend between the support member and the wire when the wire is supported by the support member. The body includes a pre-coiled shape wherein the body has at least one coil defined between the ends. The body is biased to the pre-coiled shape and is flexible such that the body is configured to be at least partially unwound from the pre-coiled shape, against the bias, for wrapping the body around the wire. The body is resiliently unwindable from the pre-coiled shape such that the body is configured to at least partially return to the pre-coiled shape as the body is wrapped around the wire.

In another embodiment, a bushing is provided for a wire. The bushing includes a polymeric body extending a length from an end to an opposite end. The body includes a natural resting position that includes a curve extending between the ends. The body is flexible such that the curve is configured to be at least partially unwound for wrapping the body around the wire. The body is resilient such that the body is configured to at least partially return to the natural resting position as the body is wrapped around the wire.

DETAILED DESCRIPTION OF THE INVENTION

Figure 1:
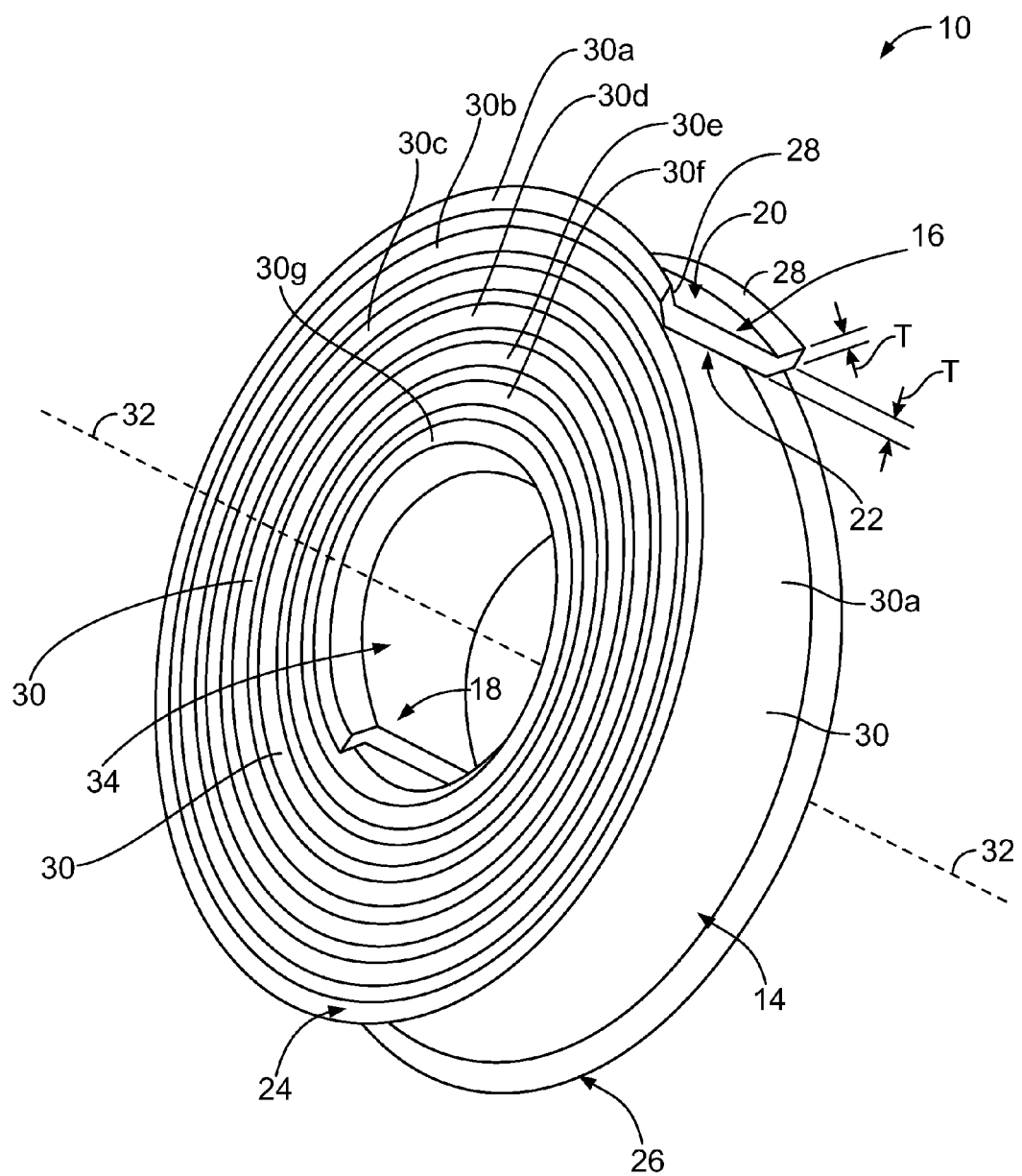
FIG. 1 is a perspective view of an exemplary embodiment of a bushing for one or more wires illustrating the bushing in an exemplary embodiment of a pre-coiled shape.
Figure 3:
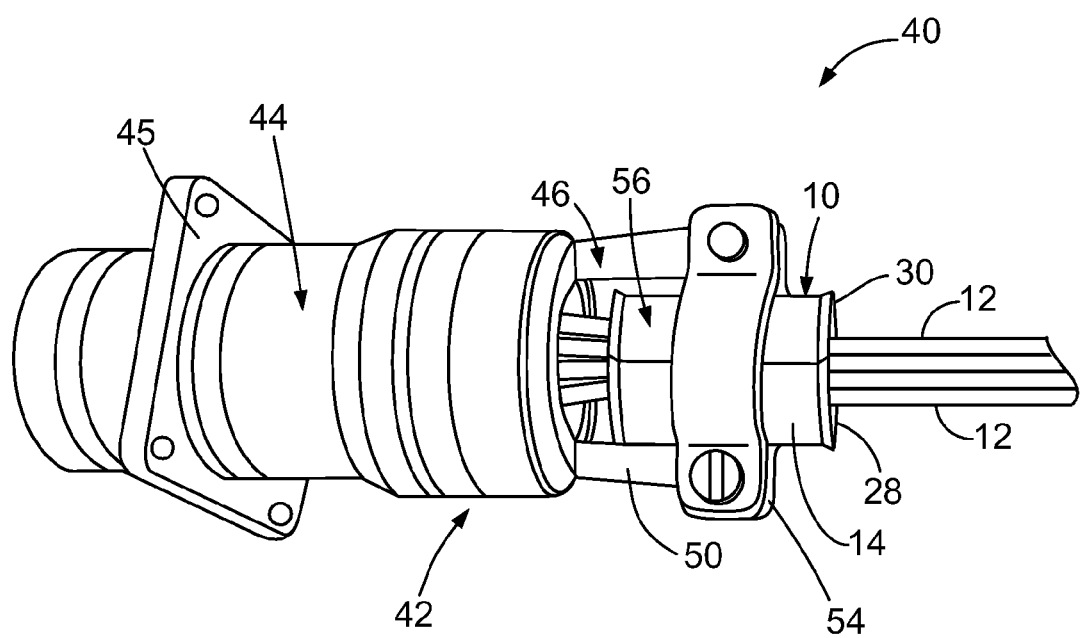
FIG. 3 is a perspective view of an exemplary embodiment of a wire and connector assembly that includes the bushing shown in FIGS. 1 and 2.
Figure 4:
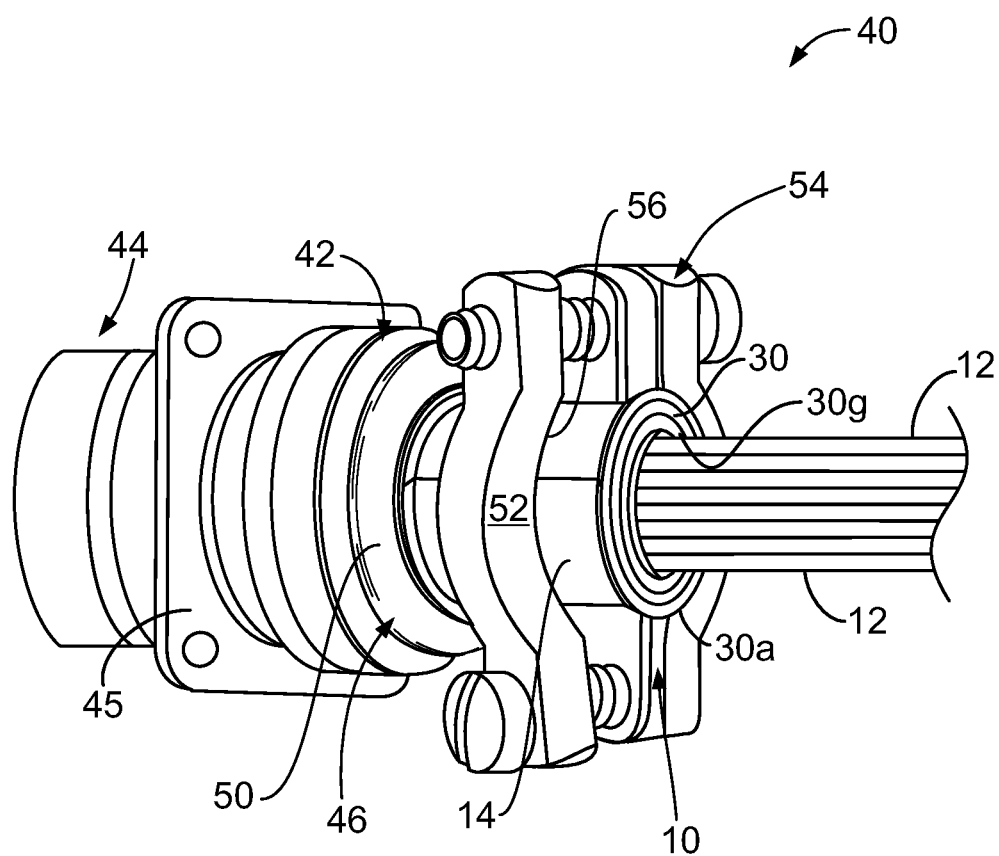
FIG. 4 is another perspective view of the wire and cable assembly shown in FIG. 3 taken from a different angle than FIG. 3.

FIG. 1 is a perspective view of an exemplary embodiment of a bushing 10 for one or more wires 12 (FIGS. 3 and 4). As will be described below in more detail, the bushing 10 is wrapped around the wire(s) 12, for example, to hold the wire(s) 12, support the wire(s) 12, protect the wire(s) 12, electrically insulate the wire(s) 12, cushion the wire(s) 12, provide strain and/or stress relief to the wire(s) 12, and/or the like. The bushing 10 may be wrapped around any number of wires 12. In some embodiments, the bushing 10 is wrapped around a plurality of wires 12, which may or may not be grouped together as a cable.

The bushing 10 includes a body 14 that extends a length from an end 16 to an opposite end 18. The body 14 of the bushing 10 includes opposite sides 20 and 22 that extend along the length of the body 14 from the end 16 to the end 18. The sides 20 and 22 also extend along a width of the body 14 from a side end 24 of the body to an opposite side end 26 of the body 14. A thickness T of the body 14 is defined between the sides 20 and 22. The body 14 may include any thickness T. In some embodiments, the thickness T of the body 14 is at least approximately 0.050 inch (0.127 cm). For example, in some embodiments the thickness T of the body 14 is approximately 0.060 inch (0.152 cm). Moreover, in some embodiments, the thickness T of the body 14 is between approximately 0.050 inch (0.127 cm) and approximately 0.200 inch (0.508 cm). Further, in some embodiments, the thickness T of the body 14 is between approximately 0.100 inch (0.254 cm) and approximately 0.150 inch (0.381 cm).

Optionally, the body 14 of the bushing 10 includes one or more ribs 28 that extends along at least a portion of the length of the body 14. In the exemplary embodiment, the body 14 includes a rib 28 at the side end 24 and a rib 28 at the side end 26. As will be described below, the optional ribs 28 may facilitate preventing the body 14 from unraveling and/or telescoping during use. In the exemplary embodiment of the bushing 10, each rib 28 is formed by a bend of the body 14 proximate the corresponding side end 24 or 26, as can be seen in FIG. 1. Alternatively, one or both of the ribs 28 is formed by extra material added to the thickness T of the body 14. Moreover, one or both of the ribs 28 may be formed by molding or profile extrusion.

The body 14 of the bushing 10 is shown in FIG. 1 in a pre-coiled shape. The pre-coiled shape of the body 14 includes one or more coils 30. Each coil 30 is defined as a curved segment (e.g., a loop, ring, curl, wrapping, and/or the like) of the length of the body 14 that curves around a central longitudinal axis 32 of the pre-coiled shape of the body 14. In the exemplary embodiment of the bushing 10, the body 14 includes a plurality of coils 30 that are wound into a spiral shape. In other words, the length of the body 14 of the bushing 10 is wound into a spiral shape beginning with the end 16 and terminating at the end 18. The pre-coiled shape of the body 14 includes a radially outermost (relative to the central longitudinal axis 32) coil 30a that includes the end 16. The pre-coiled shape of the body 14 further includes a series of sequential inner coils 30b-30g that extend from the outermost coil 30a. The inner coils 30b-30g include a radially innermost (relative to the central longitudinal axis 32) coil 30g, which includes the end 18 of the body 14. Beginning with the outermost coil 30a and moving along the length of the body 14 toward the end 18, each subsequent coil 30b-30g is nested within the previous coil 30a-30f, respectively. Specifically, each coil 30b-30g extends radially between the central longitudinal axis 32 and each previous coil 30a-30f. The nesting of the coils 30b-30g defines the spiral path of the pre-coiled shape of the body 14. As can be seen in FIG. 1, the end 18 of the body 14 is nested within the coils 30a-30g. The end 16 may be referred to herein as an "outer end", while the end 18 may be referred to herein as an "inner end".

Although seven coils 30 are shown and described herein, the pre-coiled shape of the body 14 may include any number of the coils 30. In the exemplary embodiment of the bushing 10, each of the coils 30a-30f is defined by a corresponding segment of the length of the body 14 that extends a 360° angular length. In contrast to the other coils 30a-30f, as shown the innermost coil 30g of the pre-coiled shape of the body 14 does not extend a 360° angular length in the exemplary embodiment of the bushing 10. Rather, the innermost coil 30g extends approximately 180° in angular length. However, the innermost coil 30g may extend any angular length, including 360° angular length. In the exemplary embodiment of the bushing 10, the pre-coiled shape of the body 14 includes a central opening 34. Alternatively, the end 18 is engaged with adjacent segments of the body 14 such that the pre-coiled shape of the body 14 does not include the central opening 34. The central opening 34 may enable the bushing 10 to be more easily manufactured.

The pre-coiled shape of the body 14 of the bushing 10 is not limited to the spiral shape shown in FIG. 1. In some alternative embodiments, the pre-coiled shape of the body 14 includes a plurality of coils 30 that are wound into a helical shape in addition (commonly referred to as a "conic helix") or alternative (commonly referred to as a "helix") to the spiral shape. Moreover, in some alternative embodiments, the pre-coiled shape of the body 14 includes a single coil 30. Examples of some alternative embodiments wherein the pre-coiled shape of the body 14 includes a single coil will be described below.

The body 14 of the bushing 10 is biased to the pre-coiled shape shown in FIG. 1. In other words, the pre-coiled shape of the body 14 is the natural resting position of the body 14, which includes a curve. The body 14 is flexible such that the body 14 can be at least partially unwound, against the bias, from the pre-coiled shape. Unwinding of the body 14 enables the body 14 to be wrapped around the wire(s) 12, as will be described in more detail below. In the exemplary embodiment of the bushing 10, the body 14 is sufficiently flexible such that the body 14 can be completely unwound from the pre-coiled shape to the shape of the bushing 10 shown in FIG. 2. The body 14 is optionally sufficiently flexible such that the body 14 can be partially or completely unwound from the pre-coiled shape by a user without using any tools.

The bushing body 14 is resilient such that the body 14 is resiliently unwindable from the pre-coiled shape. Accordingly, after the body 14 has been at least partially unwound from the pre-coiled shape, when a user releases the body 14 the body 14 is configured to at least partially return to the pre-coiled shape. In other words, the bias of the body 14 to the pre-coiled shape causes the body 14 to at least partially return to the pre-coiled shape. The extent that the body 14 returns to the pre-coiled shape will depend on a plurality of factors, such as, but not limited to, the amount of resilience selected for the body 14, the number and/or overall diameter of the wire(s) 12 that the body 14 is wrapped around, the size of the central opening 34 when the body 14 is in the pre-coiled shape and is not wrapped around any wire(s) 12, the length of the body 14, and/or the like. For example, if the overall diameter of the wire(s) 12 that the body is being wrapped around is greater than the size of the central opening 34 when the body 14 is in the pre-coiled shape and is not wrapped around any wire(s) 12, the body 14 will only partially return to the pre-coiled shape after being wrapped around the wire(s) 12. It should be understood that the number of coils 30 of the body 14 in the pre-coiled shape may be greater or less than the number of times that the body 14 is wrapped around the wire(s) 12 depending on the size (e.g., overall diameter) of the wire(s) 12 as compared to the length of the body 14. In some embodiments, the amount of resilience of the body 14 is selected such that the body 14, after being partially or completely unwound from the pre-coiled shape, will completely return to the pre-coiled shape if nothing (e.g., a structure such as the wire(s) 12 that the body 14 is wrapped around) obstructs the body 14.

As described above, the body 14 of the bushing 10 extends a thickness T between the sides 20 and 22. The body 14 is optionally at least partially compressible along the thickness T of the body 14. In other words, the body 14 is optionally compressible such that the sides 20 and 22 can be pushed closer to each other. In the exemplary embodiment of the bushing 10, the body 14 is resiliently compressible along the thickness T. In other words, after being at least partially compressed along the thickness T, the body 14 is biased to at least partially return to the natural resting thickness of the body 14 once the body 14 is released from the compression. When the body 14 is wrapped around the wire(s) 12, the compressibility of the body 14 along the thickness T provides a cushion between the wire(s) 12 and a support member 46 (FIGS. 3 and 4) that supports the wire(s) 12, as will be described below. The amount of compressibility of the body 14 along the thickness T may be selected to provide a predetermined amount of cushioning between the wire(s) 12 and the support member 46. When the body 14 is resiliently compressible along the thickness T, the body 14 may provide an increased amount of cushioning between the wire(s) 12 and the support member 46.

The bushing body 14 may be fabricated from any materials that enable the body 14 to function as described and/or illustrated herein. In some embodiments, the body 14 is fabricated from a polymeric material. For example, in some embodiments the body 14 is fabricated from a thermoplastic material (e.g., polyethylene and/or the like), an elastomeric material (e.g., a silicone, a silicone compound, and/or the like), and/or the like. An elastomeric material may provide the resilience of the body 14 with respect to the bias to the pre-coiled shape and/or the bias to the natural resting thickness of the body 14.

Figure 2:
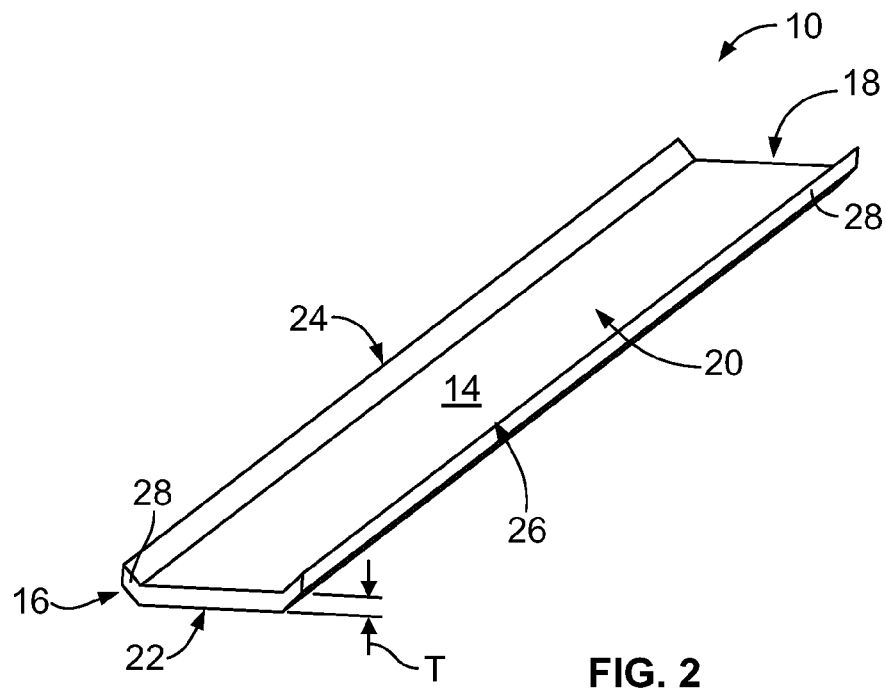
FIG. 2 is a perspective view of the bushing shown in FIG. 1 illustrating a shape of the bushing before the bushing is formed into the pre-coiled shape shown in FIG. 1.

FIG. 2 is a perspective view of the bushing 10 illustrating a shape of the bushing 10 before the bushing 10 is formed into the pre-coiled shape. FIG. 2 also illustrates the shape of the body 14 of the bushing 10 after the body 14 has been completely unwound from the pre-coiled shape shown in FIG. 1. The body 14 may be fabricated using any process, structure, means, method, and/or the like. Moreover, the body 14 may be formed into the pre-coiled shape using any process, structure, means, method, and/or the like. In the exemplary embodiment of the bushing 10, the body 14 is extruded to fabricate the body 14 having the shape shown in FIG. 2. Any extrusion molding, and/or skiving process, structure, mean, method, and/or the like may be used to fabricate the body 14 with the shape shown in FIG. 2. As can be seen in FIG. 2, the extruded body 14 extends the length from the end 16 to the end 18 and includes the sides 20 and 22 that extend along the length of the body 14 from the end 16 to the end 18. The thickness T of the body 14 is defined between the sides 20 and 22. The body 14 also extends the width from the side end 24 to the side end 26, and includes the ribs 28 at the side ends 24 and 26.

After the body 14 has been fabricated with the shape shown in FIG. 2, the body 14 may be cut to a desired length. The desired length that the body 14 is cut to may be selected to enable the body 14 to be used with a specific support member 46 and/or a specific single wire 12, bundle of wires 12, and/or cable. For example, the body 14 of the bushing 10 may be cut to a length that enables the bushing 10 to be used with a single wire 12, bundle of wires 12, and/or cable of a specific overall diameter. The length that the body 14 is cut to may be selected to enable the body 14 to be used with a specifically-sized (e.g., the opening 56) support member 46. Moreover, the body 14 of the bushing 10 may be cut to a length that provides the body 14 with a predetermined number of coils 30 and/or that provides the body 14 with a predetermined number of wrappings around the selected single wire 12, bundle of wires 12, and/or cable. In some embodiments, after the body 14 has been fabricated with the shape shown in FIG. 2, the body 14 is cut into a plurality of bodies 14 that define a plurality of bushings 10 of the same and/or different lengths. In other words, a plurality bodies 14 may be cut from a single strip of material that has been fabricated with the shape shown in FIG. 2.

To form the body 14 into the pre-coiled shape, the body 14 is wrapped around a mandrel (not shown) into the pre-coiled shape. The body 14 is optionally thermoformed and/or optionally cross-linked to set the body 14 into the pre-coiled shape. The body 14 may be cross-linked using any process, structure, means, method, and/or the like, such as, but not limited to, chemical cross-linking (e.g., via peroxide, another cross-linking agent, and/or the like), radiation cross-linking (e.g., by an electron beam, a gamma radiation source, and/or the like), and/or the like.

As discussed above, the body 14 of the bushing 10 is not limited to being extruded, wrapped around a mandrel, thermoformed, or cross-linked. Rather, the body 14 may be fabricated and formed into the pre-coiled shape using any process, structure, means, method, and/or the like. For example, in addition or alternative to being extruded, the body 14 may be molded, may be cut, and/or may be fabricated out of heat shrink tubing. Examples of some alternative embodiments for fabricating the body 14 and forming the body 14 into the pre-coiled shape, as well as the structures resulting therefrom, will be described below.

FIG. 3 is a perspective view of an exemplary embodiment of a wire and connector assembly 40 that includes the bushing 10. FIG. 4 is another perspective view of the wire and cable assembly 40 taken from a different angle than FIG. 3. The wire and connector assembly 40 includes a connector sub-assembly 42, one or more of the wires 12, and the bushing 10. The connector sub-assembly 42 includes a connector 44 that terminates the wires 12 and is configured to mate with a mating connector (not shown) to electrically and/or optically connect the wires 12 to the mating connector. In the exemplary embodiment of the assembly 40, the connector 44 terminates a plurality of the wires 12. It should be understood that the connector 44 may terminate any number of wires 12, including a single wire 12. In the exemplary embodiment of the assembly 40, each wire 12 includes an insulation layer that is discrete from the insulation layer of the other wires 12. Alternatively, one, some, or all of the wires 12 do not include a discrete insulating layer. Moreover, in the exemplary embodiment of the assembly 40, the wires 12 are grouped together without using a common jacket, which is commonly referred to as a "wire bundle" and/or a "wire harness". But, in some alternative embodiments, the plurality of wires 12 are surrounded by a common jacket (whether or not any of the wires 12 include a discrete insulating layer), which is commonly referred to as a "cable". As used herein, the term "wire" is not limited to an electrical wire or an optical wire. In other words, each of the wires described and/or illustrated herein (e.g., the wires 12) need not include an electrical conductor or an optical conductor. Rather, each wire may be any elongate structure, whether generally rigid or generally flexible, that one or more of the bushings described and/or illustrated herein (e.g., the bushing 10) is capable of being wrapped around. In some alternative embodiments, one or more of the wires described and/or illustrated herein is a conduit (e.g., a tube and/or the like) that is configured to carry a fluid (e.g., a fuel, air, and/or the like). Moreover, in some alternative embodiments, one or more of the wires described and/or illustrated herein is a solid rod.

The connector sub-assembly 42 includes the connector 44 and a support member 46 that mounts to a rear end of the connector 44 for supporting the wires 12. The connector 44 includes an optional mounting flange 45, for example for mounting the connector to a wall, panel, and/or the like. In the exemplary embodiment of the assembly 40, the support member 46 is a clamp. But, the support member 46 may alternatively be another structure, such as, but not limited to, a panel through which the wires 12 are passed through and/or the like. In the exemplary embodiment of the assembly 40, the support member 46 is a saddle clamp that includes a body 50 and a pair of opposing clamping members 52 and 54 that are mounted to the body 50 and that are discrete from each other. Optionally, one or both of the clamping members 52 and 54 is hingedly mounted on the body for rotation relative thereto. The support member 46 includes an opening 56 for receiving the wires 12 therethrough. The opening 56 extends between the clamping members 52 and 54 and through the body 50 of the support member 46. In some alternative embodiments, the support member 46 is another type of clamp, such as, but not limited to a P-clamp and/or the like. A combination of the support member 46 and the bushing 10 may be referred to herein as a "support assembly".

When installed within the assembly 40, the body 14 of the bushing 10 is wrapped around the wires 12 in a position within the opening 56 of the support member 46 such that the body 14 extends radially between the wires 12 and the clamping members 52 and 54. The bushing 10 can be installed within the assembly 40 after the wires 12 have been terminated to the connector 44, which is commonly referred to as a "side entry". For example, after terminating the wires 12 to the connector 44, the support member 46 may be mounted on the connector 44. Alternatively the support member 46 is mounted on the connector 44 before the wires 12 are terminated to the connector 44. The body 14 of the bushing 10 is then at least partially unwound from the pre-coiled shape and wrapped around the circumference of the bundle of wires 12 at a location along the length of the wires 12 that is spaced from the support member 46. Once the bushing body 14 has been wrapped around the wires 12, the body 14 is moved along the length of the wires 12 toward the support member 46 until the body 14 is in position within the opening 56 wherein the body 14 extends radially between the wires 12 and the clamping members 52 and 54. The clamping members 52 and 54 may be loosened relative to each other to facilitate insertion of the bushing body 14 into the opening 56. Once the body 14 of the bushing 10 is positioned within the opening 56 between the wires 12 and the clamping members 52 and 54, the clamping members 52 and 54 are tightened relative to each other until at least the clamping members 52 and 54 are engaged with the body 14. Optionally, the clamping members 52 and 54 may be tightened relative to each other sufficiently to at least partially compress the body 14 of the bushing 10 between the wires 12 and the clamping members 52 and 54. In some alternative embodiments, the support member 46 is mounted on the connector 44 after the bushing body 14 has been wrapped around the wires 12.

Referring now solely to FIG. 4, in the exemplary embodiment of the assembly 40, the length of the body 14 as compared to the overall diameter of the bundle of wires 12 is such that the number of wrappings of the body 14 around the bundle of wires 12 is the same as the number of coils 30 of the body 14. Specifically, the innermost coil 30g of the body is wrapped around and engaged with the circumference of the bundle of wires 12. Notably, in the exemplary embodiment of the bushing 10, the innermost coil 30g is only wrapped around a portion of the circumference of the bundle of wires 12 because the innermost coil 30g has an angular length of less than 360°. A portion of the length of the coil 30f is also wrapped around and engaged with the circumference of the bundle of wires 12. The remainder of the coil 30f is wrapped around the wires 12 and the coil 30g in engagement with the coil 30g. Each successive coil 30e-30a (moving along the length of the body 14 toward the end 16) is wrapped around the wires 12 and the previous coil 30f-30b, respectively, in engagement with the previous coil 30f-30b, respectively. It should be understood that in alternative embodiments wherein the coils 30 of the bushing body 14 have a helical shape, successive coils 30 along the length of the body 14 may or may not be engaged with (i.e., overlap) the previous coil 30.

When the body 14 of the bushing 10 is installed within the assembly 40 as described above and shown in FIGS. 3 and 4, stiction between the body 14 and the bundle of wires 12, stiction between the body 14 and the clamping members 52 and 54, and/or stiction between the coils 30 of the body 14 facilitates holding the body 14 in position along the length of the wires 12. Stiction between the body 14 and the bundle of wires 12, stiction between the body 14 and the clamping members 52 and 54, and/or stiction between the coils 30 of the body 14 may facilitate preventing the body 14 from unwinding and/or telescoping. Moreover, the optional ribs 28 may also facilitate preventing the body 14 from unwinding and/or telescoping. Notably, in the exemplary embodiment of the assembly 40, the body 14 of the bushing 10 does not include an adhesive thereon. Because of the stiction and/or the ribs 28, adhesive is not necessary to hold the body 14 in position along the length of the wires 12, nor to prevent the body 14 from unwinding or telescoping. In some alternative embodiments, one or both of the sides 20 and 22 (FIGS. 1 and 2) of the body 14 includes an adhesive.

In the exemplary embodiment of the assembly 40, the bushing 10 is wrapped around a plurality of the wires 12. But, the body 14 of the bushing 10 may be wrapped around any number of wires 12, including a single wire 12. Although each wire 12 includes an insulation layer that is discrete from the insulation layer of the other wires 12, alternatively the bushing body 14 may be wrapped around one or more wires 12 that do not include a discrete insulating layer. In some alternative embodiments, the body 14 of the bushing 10 is wrapped around a cable (i.e., a plurality of wires 12 surrounded by a common jacket, whether or not any of the wires 12 includes a discrete insulating layer). As discussed above, in the exemplary embodiment of the assembly 40, the length of the body 14 as compared to the overall diameter of the bundle of wires 12 is such that the number of wrappings of the body 14 around the bundle of wires 12 is the same as the number of coils 30 of the body 14. But, the number of coils 30 of the body 14 in the pre-coiled shape may alternatively be greater or less than the number of times that the body 14 is wrapped around the wire(s) 12. The length of the body 14 of the bushing 10, the number of coils 30 of the body 14 in the pre-coiled shape, the thickness T of the body 14, and/or the amount of compressibility of the body 14 may be selected to provide a predetermined number of wrappings between the support member 46 and a predetermined overall diameter of a single wire 12, a bundle of wires 12, and/or a cable. In some embodiments, a single body 14 accommodates a range of overall diameters of a single wire 12, a bundle of wires 12, and/or a cable.

As described above, the bushing 10 may be used to hold the wires 12, support the wires 12, cushion the wires 12, protect the wires 12, electrically insulate the wires 12, provide strain and/or stress relief to the wires 12, and/or the like. For example, the bushing 10 provides strain and/or stress relief to the wires 12 by shimming the radial gap between the wires 12 and the clamping members 52 and 54 of the support member 46. In other words, the body 14 of the bushing 10 extends radially between the wires 12 and the clamping members 52 and 54 such that the body 14 fills the radial gap between the wires 12 and the clamping members 52 and 54. Accordingly, the bushing 10 may be used in place of a foam, a grommet, a tape, or any other type of shim member for shimming the radial gap between the wires 12 and the clamping members 52 and 54. In some embodiments, and for example, the body 14 of the bushing 10 fills a radial gap between the wires 12 and the clamping members 52 and 54 of between approximately 0.020 inch (0.051 cm) and approximately 1.000 inch (2.540 cm). The bushing 10 may electrically insulate the wires 12 and/or may protect the wires 12 against abrasion resulting from vibration, torque, twist, and/or the like of the wires 12 and/or the connector sub-assembly 42. Moreover, the bushing 10 may prevent foreign object debris (FOD) from entering the connector 44 and/or lodging between the wires 12 and the support member 46, which thereby protects the connector 44, the support member 46, and/or the wires 12 from damage caused by such FOD. The bushing 10 may provide a cushion between the wires 12 and the support member 46, which may dampen vibrations and other forces that may damage the wires 12, the connector 44, and/or the support member 46. The thickness T (FIGS. 1 and 2) of the body 14, the number of wrappings around the wires 12, and/or the amount of compressibility of the body 14 (including whether the body 14 is resiliently compressible) may be selected to provide the bushing 10 with a predetermined amount of cushioning and/or dampening. Further, the bushing 10 may be used as a wire management device that holds, supports, and/or organizes the wires 12. For example, the bushing 10 may be used to hold the bundle of wires 12 together. Moreover, the bushing 10 may be used as a marking or labeling device using any type of mark, label, and/or the like, such as, but not limited to, color coding, ink jet marking, laser, marking, and/or the like.

The bushing 10 is reusable. For example, the bushing 10 may be removed from the assembly 40 and used with a different wire(s) 12, cable, and/or connector sub-assembly 42. Specifically, when the bushing 10 is removed from the assembly 40 by unwrapping the body 14 from around the wires 12, the bushing body 14 will at least partially return to the pre-coiled shape. The bushing can thereafter be unwound from the pre-coiled shape and wrapped around the different wire(s) 12 and/or cable. Moreover, the bushing 10 may be reused with the same assembly 40 after the connector 44 or another component of the assembly 40 has been reworked. For example, to rework the connector 44, the clamping members 52 and 54 are loosened relative to each other and the bushing 10 is unwrapped from around the wires 12 (and at least partially returns to the pre-coiled shape). The connector 44 can then be reworked as desired. After the connector 44 has been reworked, the bushing 10 is unwound from the pre-coiled shape and re-wrapped around the wires 12.

Figure 5:
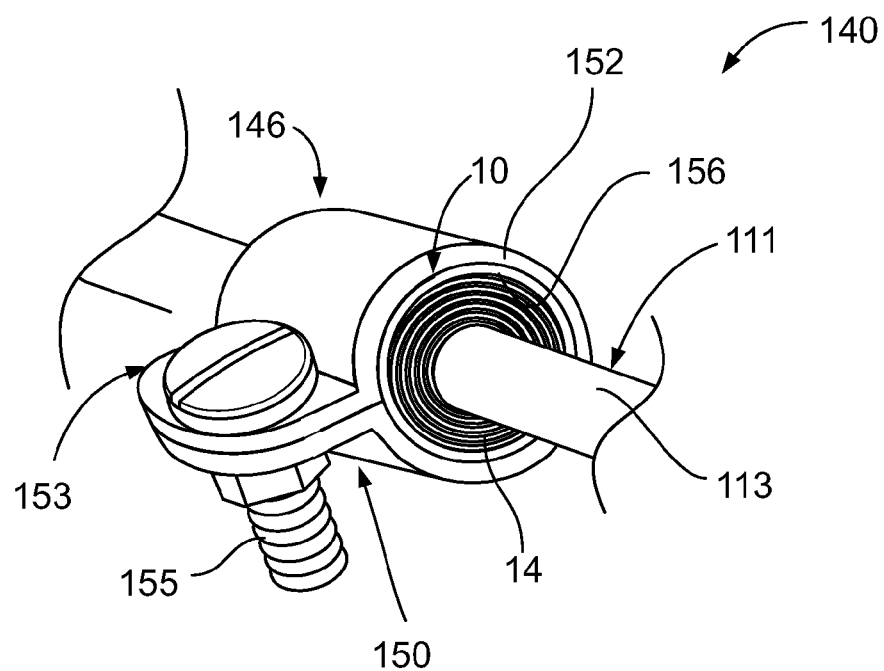
FIG. 5 is a perspective view of an exemplary embodiment of a wire assembly that includes the bushing shown in FIGS. 1 and 2.

The bushing 10 is not limited to being used with a support member that mounts to a connector that terminates one or more wires. For example, bushing 10 may be used with a mounting member that is used to mount the one or more wires to a structure. FIG. 5 is a perspective view of an exemplary embodiment of a wire assembly 140 that includes the bushing 10. The wire assembly 140 includes a support member 146, a cable 111, and the bushing 10. In alternative to the cable 111, the wire assembly 140 may include one or more of the wires 12. The cable 111 includes a plurality of wires (not visible) surrounded by a common jacket 113. In the exemplary embodiment of the assembly 140, the support member 146 is a P-clamp that is used to mount the cable 111 to structure (not shown), such as, but not limited to, a wall, a panel, a floor, a ceiling, and/or the like. The support member 146 includes a body 150 having a single, circular-shaped, clamping member 152. The clamping member 152 defines an opening 156 for receiving the cable 111 therethrough. The clamping member 152 includes a flange 153 that receives a fastener 155 for tightening and loosening the clamping member 152 and/or for mounting the support member 146 to the structure. When installed within the assembly 140 as shown in FIG. 5, the body 14 of the bushing 10 is wrapped around the cable 111 in a position within the opening 156 of the support member 146 such that the body 14 extends radially between the cable 111 and the clamping member 152. A combination of the support member 146 and the bushing 10 may be referred to herein as a "support assembly". The support member 146 may be referred to herein as a "mounting member".

The bushing 10 may provide strain and/or stress relief to the cable 111 by shimming the radial gap between the cable 111 and the clamping member 152 of the support member 146. The bushing 10 may electrically insulate the cable 111. The bushing 10 may protect the cable 111 against abrasion resulting from vibration, torque, twist, and/or the like of the cable 111 and/or the support member 146. Moreover, the bushing 10 may prevent FOD from lodging between the cable 111 and the support member 146, which thereby protects the support member 146 and/or the cable 111 from damage caused by such FOD. The bushing 10 may provide a cushion between the cable 111 and the support member 146, which may dampen vibrations and other forces that may damage the cable 111 and/or the support member 146. The thickness T (FIGS. 1 and 2) of the body 14, the number of wrappings around the cable 111, and/or the amount of compressibility of the body 14 (including whether the body 14 is resiliently compressible) may be selected to provide the bushing 10 with a predetermined amount of cushioning and/or dampening. Further, the bushing 10 may be used as a marking or labeling device using any type of mark, label, and/or the like, such as, but not limited to, color coding, ink jet marking, laser, marking, and/or the like.

Figure 6:
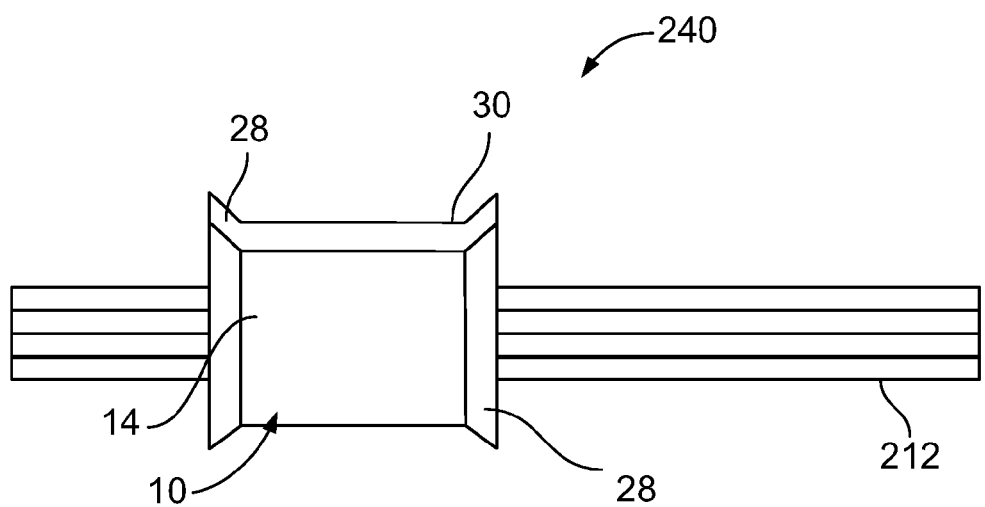
FIG. 6 is a perspective view of an exemplary alternative embodiment of a wire assembly that includes the bushing shown in FIGS. 1 and 2.

FIG. 6 is a perspective view of an exemplary alternative embodiment of a wire assembly 240 that includes the bushing 10. In the exemplary embodiment of FIG. 6, the bushing 10 is used as a wire management device. The wire assembly 240 includes the bushing 10 and one or more wires 212. In the exemplary embodiment of the assembly 240, the assembly 240 includes a bundle of a plurality of wires 212. The body 14 of the bushing 10 is wrapped around the wires 212. Specifically, the body 14 of the bushing 10 is first at least partially unwound from the pre-coiled shape and thereafter wrapped around the circumference of the bundle of wires 212. When wrapped around the bundle of wires 212, the body 14 of the bushing 10 holds and organizes the wires 212. For example, the bushing 10 holds the wires 212 together in the bundle.

The bias of the bushing body 14 to the pre-coiled shape, stiction between the body 14 and the bundle of wires 212, and/or stiction between the coils 30 of the body 14 facilitates holding the body 14 in place around the wires 212. For example, the bias of the body 14 of the bushing 10, stiction between the body 14 and the bundle of wires 212, and/or stiction between the coils 30 of the body 14 may facilitate preventing the body 14 from unwinding and/or telescoping. Moreover, the optional ribs 28 may also facilitate preventing the body 14 from unwinding and/or telescoping. Notably, in the exemplary embodiment of the assembly 240, the body 14 of the bushing 10 does not include an adhesive thereon. Because of the bias, the stiction, and/or the ribs 28, adhesive is not necessary to hold the body 14 in place around the bundle of wires 212, nor to prevent the body 14 from unwinding or telescoping. In some alternative embodiments, one or both of the sides 20 and 22 (FIGS. 1 and 2) of the body 14 includes an adhesive.

Figure 7:
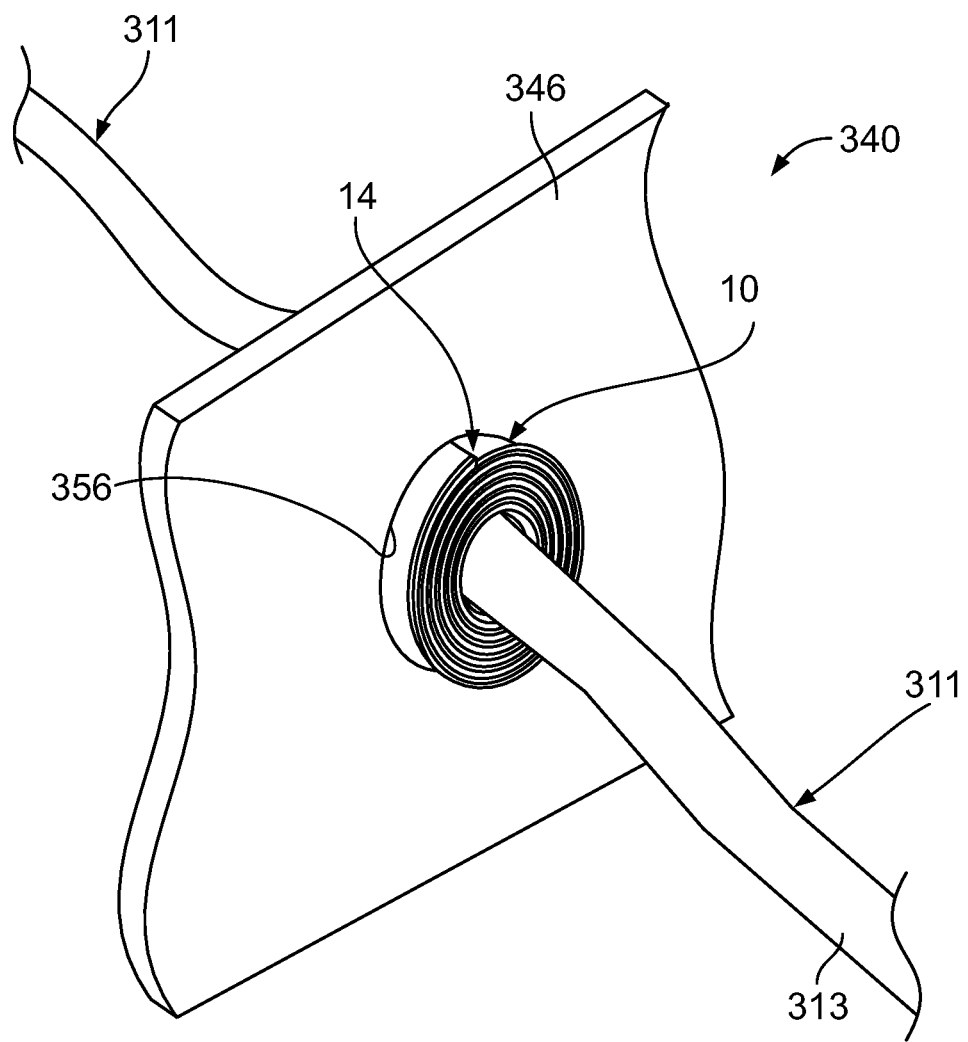
FIG. 7 is a perspective view of another exemplary alternative embodiment of a wire assembly that includes the bushing shown in FIGS. 1 and 2.

FIG. 7 is a perspective view of another exemplary embodiment of a wire assembly 340 that includes the bushing 10. The wire assembly 340 includes a support member 346, a cable 311, and the bushing 10. In alternative to the cable 311, the wire assembly 340 may include one or more of the wires 12. The cable 311 includes a plurality of wires (not visible) surrounded by a common jacket 313. In the exemplary embodiment of the assembly 340, the support member 346 is a structure (such as, but not limited to, a wall, a panel, a floor, a ceiling, and/or the like) having an opening 356 through which the cable 311 is passed. When installed within the assembly 340 as shown in FIG. 7, the body 14 of the bushing 10 is wrapped around the cable 311 in a position within the opening 356 of the support member 346 such that the body 14 extends radially between the cable 311 and the support member 346. A combination of the support member 346 and the bushing 10 may be referred to herein as a "support assembly".

The bushing 10 may provide strain and/or stress relief to the cable 311 by shimming the radial gap between the cable 311 and the support member 346. The bushing 10 may electrically insulate and/or seal the cable 311. The bushing 10 may protect the cable 311 against abrasion resulting from vibration, torque, twist, and/or the like of the cable 311 and/or the support member 346. Moreover, the bushing 10 may prevent FOD from lodging between the cable 311 and the support member 346, which thereby protects the support member 346 and/or the cable 311 from damage caused by such FOD. The bushing 10 may provide a cushion between the cable 311 and the support member 346, which may dampen vibrations and other forces that may damage the cable 311 and/or the support member 346. Moreover, the bushing 10 may be used as a marking or labeling device using any type of mark, label, and/or the like, such as, but not limited to, color coding, ink jet marking, laser, marking, and/or the like.

Figure 8:
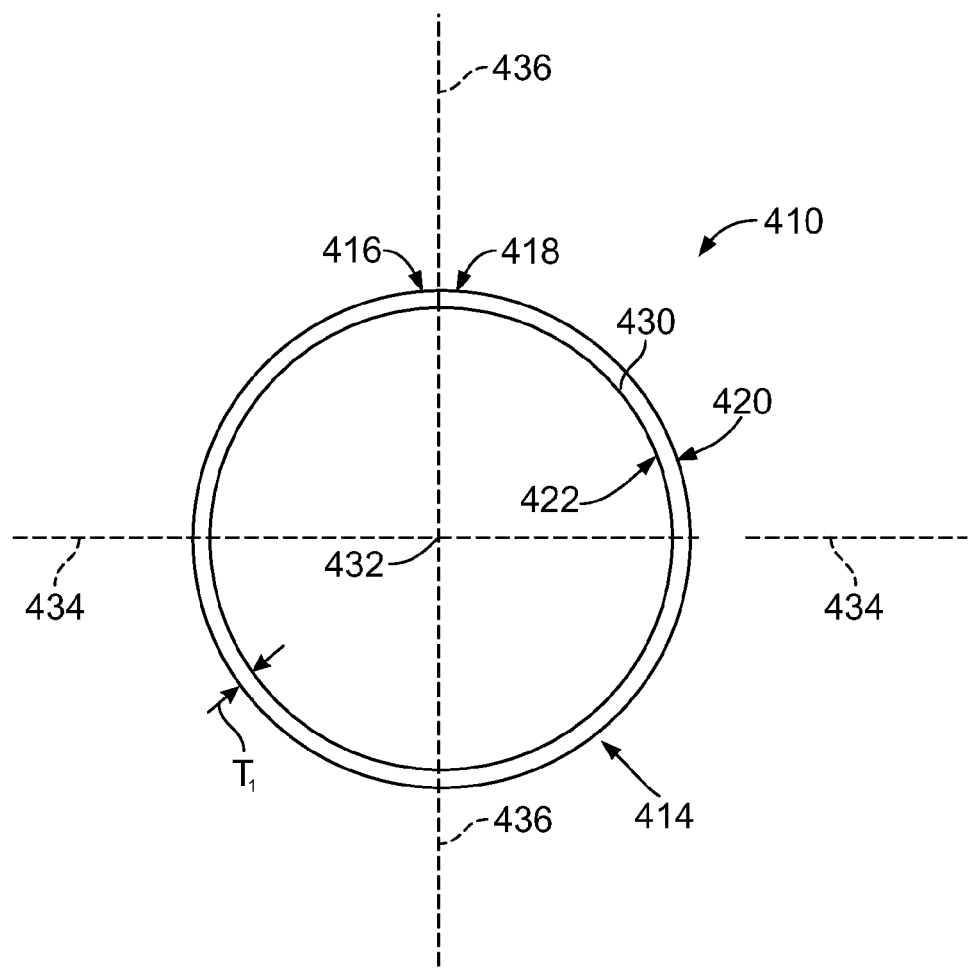
FIG. 8 is a plan view of an exemplary alternative embodiment of a bushing for one or more wires.

FIG. 8 is a plan view of an exemplary alternative embodiment of a bushing 410 for the one or more wires 12 (FIGS. 3 and 4), wherein the pre-coiled shape of the bushing 410 includes a single coil 430. The bushing 410 includes a body 414 that extends a length from an end 416 to an opposite end 418. The body 414 includes opposite sides 420 and 422 that extend along the length of the body 414 from the end 416 to the end 418 and that define a thickness $T_1$ of the body 414 therebetween. The body 414 of the bushing 410 is shown in FIG. 8 in a pre-coiled shape. The pre-coiled shape of the body 414 includes a single coil 430. The coil 430 is a curved segment (e.g., a loop, ring, curl, wrapping, and/or the like) of the body 414 that curves around a central longitudinal axis 432 of the pre-coiled shape of the body 414. In the exemplary embodiment of the bushing 410, the coil 430 defines an entirety of the length of the body 414. Alternatively, the coil 430 defines only a portion of the length of the body 414 (e.g., the end 416 and/or the end 418 includes a flange (not shown) that extends radially outwardly relative to the central longitudinal axis 432). A bushing including a single coil is suitable for use when the bushing surrounds a rigid or relatively rigid substrate that is to be used with a clamp or other device to maintain the bushing and the abutted ends 416, 418 in position. Such substrates, such as relatively stiff cable jackets or pipes for carrying fuel, generally do not collapse when a clamp is attached and avoid wrinkling of the bushing that may occur when used with flexible substrates such as wires.

In the exemplary embodiment of the bushing 410, the ends 416 and 418 of the body 414 are approximately aligned with each other along the central longitudinal axis 432. In other words, the center of a width of the body 414 at the end 416 and the center of the width of the body 414 at the end 418 lie approximately in a common plane that extends perpendicular to the central longitudinal axis 432 and parallel to an axis 434 that extends perpendicular to the central longitudinal axis 432. Accordingly, the coil 430 does not follow a helical path. Alternatively, the ends 416 and 418 of the body 414 are offset from each other along the central longitudinal axis 432 such that the coil 430 follows a helical path. In alternative embodiments wherein the coil 430 follows a helical path, the end 416 or the end 418 may extend past the other end 416 or 418. In other words, in alternative embodiments wherein the coil 430 follows a helical path, the angular length of the body 414 is optionally greater than 360°. In such alternative embodiments wherein the coil 430 follows a helical path and the angular length of the body 414 is greater than 360°, the body 414 may be considered to include a single coil 430 having of an angular length greater than 360° or may be considered to have two coils 430 (i.e., an outermost coil having an angular length of 360° and an inner coil having an angular length of less than 360°). Moreover, with respect to such alternative embodiments wherein the coil(s) 430 follows a helical path and the angular length of the body 414 is greater than 360°, each of the ends 416 and 418 may be referred to herein as an "outer end" or as an "inner end".

The ends 416 and 418 of the body 414 oppose each other and, in the exemplary embodiment of the bushing 10, abut each other because of the alignment of the ends 416 and 418 along the central longitudinal axis 432. The coil 430 has an approximately constant curvature along the length of the body 414 in the exemplary embodiment of the bushing 410. In other words, the coil 430 has the shape of a circle. Accordingly, the coil 430 does not follow a spiral path. But, the curvature of the coil 430 may alternatively be non-constant along the length of the body 414 such that the ends 416 and 418 are offset from each other along an axis 436 that is perpendicular to the axis 434. In other words, in some alternative embodiments, the coil 430 follows a spiral path. In alternative embodiments wherein the coil 430 follows a spiral path, the end 416 or the end 418 may extend past the other end 416 or 418. In other words, in alternative embodiments wherein the coil 430 follows a spiral path, the angular length of the body 414 is optionally greater than 360°. In such alternative embodiments wherein the coil 430 follows a spiral path and the angular length of the body 414 is greater than 360°, the body 414 may be considered to include a single coil 430 having an angular length greater than 360° or may be considered to have two coils 430 (i.e., an outermost coil having an angular length of 360° and an inner coil having an angular length of less than 360°). Further, in such alternative embodiments wherein the coil(s) 430 follows a spiral path and the angular length of the body 414 is greater than 360°, the end 416 or 418 is nested within the single coil 430 (or the outermost coil when the body 414 is considered to have two coils 430). Moreover, with respect to such alternative embodiments wherein the coil(s) 430 follows a spiral path and the angular length of the body 414 is greater than 360°, each of the ends 416 and 418 may be referred to herein as an "outer end" or as an "inner end". It should be understood that, in some alternative embodiments, the coil(s) 430 of the body 414 may follow both a spiral and a helical path.

Figure 9:
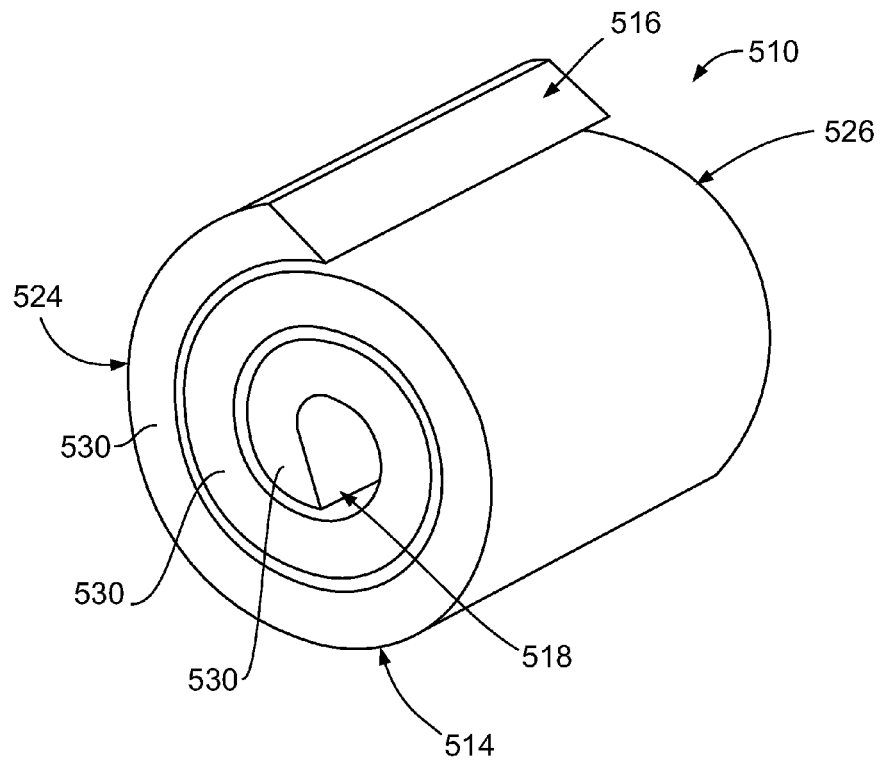
FIG. 9 is a perspective view of an exemplary alternative embodiment of a bushing for one or more wires fabricated using an exemplary alternative fabrication embodiment.

FIG. 9 is a perspective view of an exemplary alternative embodiment of a bushing 510 for the one or more wires 12 (FIGS. 3 and 4) fabricated using an exemplary alternative fabrication embodiment. The bushing 510 includes a body 514 that has been formed into a pre-coiled shape that includes a plurality of coils 530 wound into a spiral shape. The body 514 is fabricated using heat shrink tubing. Specifically, a heat shrink tubing extends from an end 524 to an opposite end 526. The heat shrink tubing is severed from the end 524 to the end 526 to define a body 514 that includes opposite ends 516 and 518. The body 514 extends a length from the end 516 to the end 518, and extends a width from the end 524 to the end 526. The body 514 is then wrapped around a mandrel (not shown) into the pre-coiled shape. The body 514 is optionally thermoformed and optionally cross-linked to set the body 514 into the pre-coiled shape. The body 514 may be cross-linked using any process, structure, means, method, and/or the like, such as, but not limited to, chemical cross-linking (e.g., via peroxide, another cross-linking agent, and/or the like), radiation cross-linking (e.g., by an electron beam, a gamma radiation source, and/or the like), and/or the like.

Figure 10:
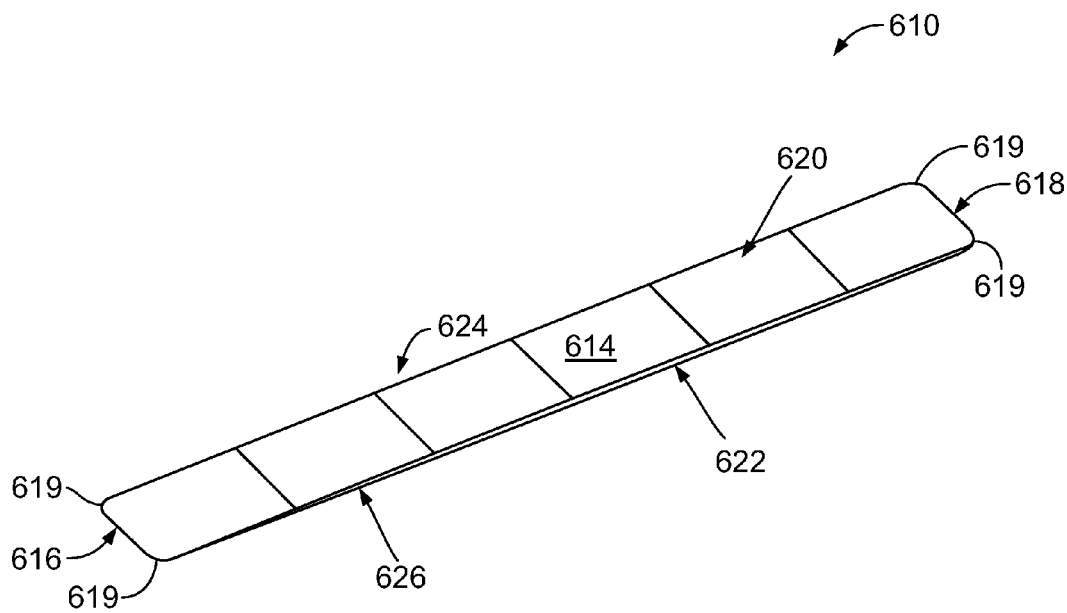
FIG. 10 is a perspective view of another exemplary alternative embodiment of a bushing for one or more wires fabricated using another exemplary alternative fabrication embodiment.

FIG. 10 is a perspective view of another exemplary alternative embodiment of a bushing 610 for the one or more wires 12 (FIGS. 3 and 4) fabricated using another exemplary alternative fabrication embodiment. The bushing 610 includes a body 614 that is shown in FIG. 10 before the bushing 610 is formed into a pre-coiled shape. FIG. 10 also illustrates the shape of the body 614 after the body 614 has been completely unwound from the pre-coiled shape. The body 614 is fabricated by being molded to fabricate the body 614 having the shape shown in FIG. 10. Any molding process, structure, mean, method, and/or the like may be used to fabricate the body 614 with the shape shown in FIG. 10. The molded body 614 extends a length from an end 616 to an opposite end 618, and extends a width from a side end 624 to an opposite side end 626. The side ends 624 and 626 intersect the ends 616 and 618 at corners 619. The body 614 includes opposite sides 620 and 622 that extend along the length of the body 614 from the end 616 to the end 618. A thickness of the body 614 optionally tapers inwardly at the end 616 and/or the end 618, as can be seen in FIG. 10. Moreover, the width of the body 614 optionally tapers inwardly at the end 616 and/or the end 618. Optionally, one or more of the corners 619 is rounded.

To form the body 614 into the pre-coiled shape, the body 614 is wrapped around a mandrel (not shown) into the pre-coiled shape. In the pre-coiled shape, the body 614 includes a plurality of coils (not shown) wound into a spiral shape. The body 614 is optionally thermoformed and/or optionally cross-linked to set the body 614 into the pre-coiled shape. The body 614 may be cross-linked using any process, structure, means, method, and/or the like, such as, but not limited to, chemical cross-linking (e.g., via peroxide, another cross-linking agent, and/or the like), radiation cross-linking (e.g., by an electron beam, a gamma radiation source, and/or the like), and/or the like.

Figure 11:
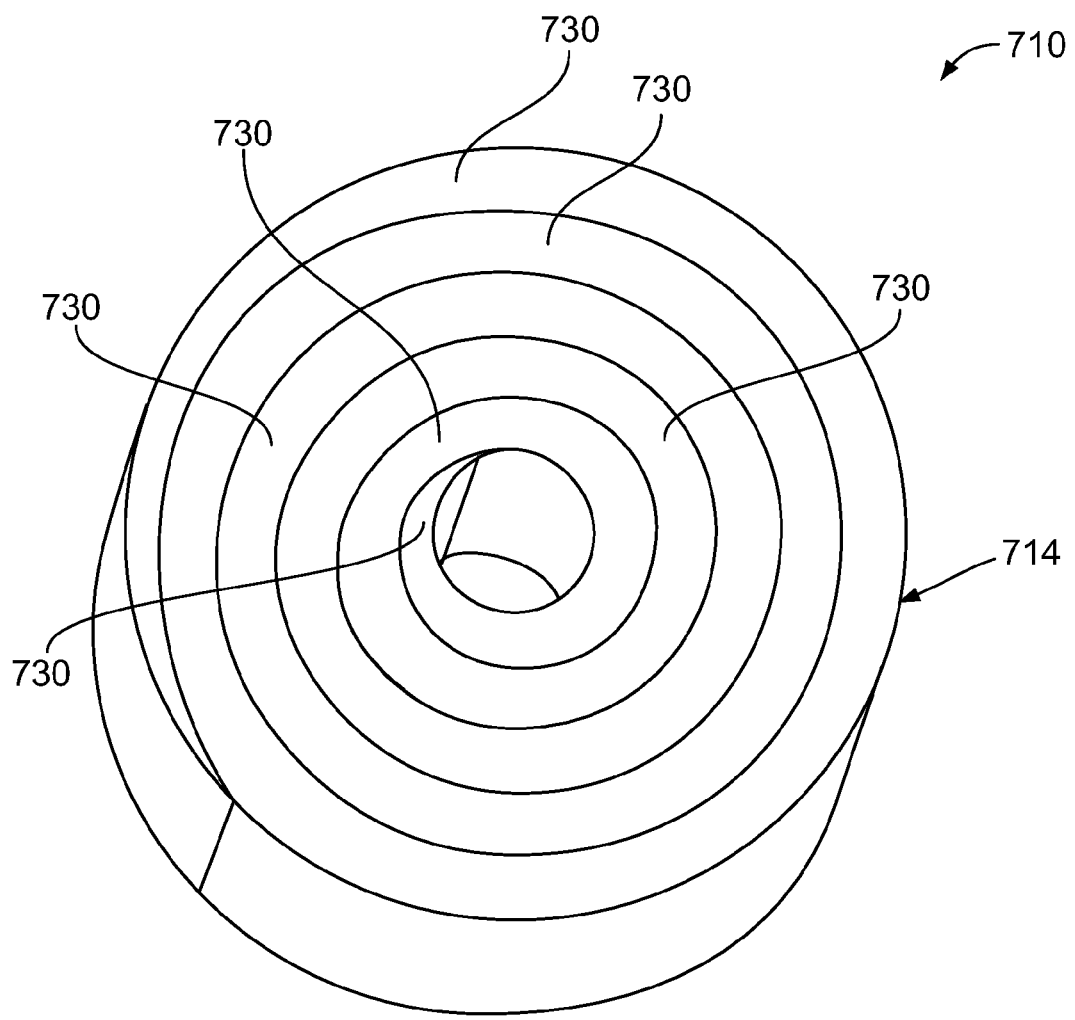
FIG. 11 is a perspective view of another exemplary alternative embodiment of a bushing for one or more wires fabricated and formed in a pre-coiled shape using an exemplary alternative fabrication and forming embodiment.

FIG. 11 is a perspective view of another exemplary alternative embodiment of a bushing 710 for the one or more wires 12 (FIGS. 3 and 4) fabricated and formed into a pre-coiled shape using an exemplary alternative fabrication and forming embodiment. The bushing 710 includes a body 714 that has been formed into a pre-coiled shape that includes a plurality of coils 730 wound into a spiral shape. The body 714 is fabricated by molding a cross-linked material to fabricate the body 714 with the general disc-shape shown in FIG. 11. More specifically, the molded body 714 does not yet include the coils 730. Any molding process, structure, mean, method, and/or the like may be used to fabricate the body 714. The body 714 is then cut to define the coils 730. More specifically, the spiral path of the coils 730 is cut from the molded disc-shaped body 714. Any cutting process, structure, mean, method, and/or the like may be used to cut the spiral path of the coils 730, such as, but not limited to, waterjet cutting, laser cutting, and/or the like.

The embodiments described and/or illustrated herein may provide a bushing that takes less time and/or is less labor intensive to install than at least some known shim members. The embodiments described and/or illustrated herein may provide a bushing that is less expensive to manufacture and/or install than at least some known shim members. The embodiments described and/or illustrated herein may provide a bushing that is reusable.

It is to be understood that the above description is intended to be illustrative, and not restrictive. For example, the above-described embodiments (and/or aspects thereof) may be used in combination with each other (whether or not such a combination is explicitly discussed herein). In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the subject matter described and/or illustrated herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A reusable bushing for a wire, said bushing comprising:
a cross-linked polymeric body extending a length from an end to an opposite end, the body comprising a pre-coiled shape wherein the body comprises at least one coil defined between the ends, the body being biased to the pre-coiled shape and being flexible such that the body is configured to be at least partially unwound from the pre-coiled shape, against the bias, for wrapping the body around the wire, the body being resiliently unwindable from the pre-coiled shape such that the body is configured to at least partially return to the pre-coiled shape as the body is wrapped around the wire, the body being configured to at least partially return to the pre-coiled shape as the body is unwrapped from the wire, and the body being free of an adhesive.

2. The bushing of claim 1, wherein the at least one coil of the pre-coiled shape of the body comprises a plurality of coils wound into a spiral shape.

3. The bushing of claim 1, wherein the at least one coil of the pre-coiled shape of the body comprises an outermost coil and at least one inner coil that is nested within the outermost coil.

4. The bushing of claim 1, wherein the ends of the body comprise an inner end and an outer end, the inner end being nested within the at least one coil of the pre-coiled shape of the body.

5. The bushing of claim 1, wherein the body extends a thickness between opposite sides that extend along the length of the body, the body being compressible along the thickness of the body.

6. The bushing of claim 1, wherein the body extends a thickness between opposite sides that extend along the length of the body, the thickness of the body being at least approximately 0.050 inch (0.127 cm).

7. The bushing of claim 1, wherein the body extends a width between opposite side ends, at least one of the side ends comprising a rib.

8. The bushing of claim 1, wherein the body extends a thickness between opposite sides that extend along the length of the body, the body being resiliently compressible along the thickness of the body.

9. The bushing of claim 1, wherein the body is cross-linked while in the pre-coiled shape.

10. The bushing of claim 1, wherein the polymeric body comprises at least one of a thermoplastic or an elastomeric material.

11. The bushing of claim 10, wherein the polymeric body comprises silicone.

12. A support assembly for supporting a wire, said assembly comprising:
   a support member configured to support the wire; and
   a reusable bushing comprising a cross-linked polymeric body extending a length from an end to an opposite end, the body being configured to extend between the support member and the wire when the wire is supported by the support member, the body comprising a pre-coiled shape wherein the body comprises at least one coil defined between the ends, the body being biased to the pre-coiled shape and being flexible such that the body is configured to be at least partially unwound from the pre-coiled shape, against the bias, for wrapping the body around the wire, the body being resiliently unwindable from the pre-coiled shape such that the body is configured to at least partially return to the pre-coiled shape as the body is wrapped around the wire, the body being configured to at least partially return to the pre-coiled shape as the body is unwrapped from the wire, and the body being free of an adhesive.

13. The assembly of claim 12, wherein the at least one coil of the pre-coiled shape of the body of the bushing comprises a plurality of coils wound into spiral shape.

14. The assembly of claim 12, wherein the ends of the body of the bushing comprise an inner end and an outer end, the inner end being nested within the at least one coil of the pre-coiled shape of the body.

15. The assembly of claim 12, wherein the body of the bushing provides a cushion between the support member and the wire when the wire is supported by the support member.

16. The assembly of claim 12, wherein the body of the bushing extends a thickness between opposite sides that extend along the length of the body, the thickness of the body being at least approximately 0.050 inch (0.127 cm).

17. The assembly of claim 12, wherein the body of the bushing is cross-linked while in the pre-coiled shape.

18. The assembly of claim 12, wherein the support member comprises one of:
   a clamp;
   a clamp that mounts to a connector that terminates the wire;
   a mounting member used to mount the wire to a structure; or
   a structure comprising an opening through which the wire extends.

19. A reusable bushing for a wire, said bushing comprising:
   a cross-linked polymeric body extending a length from an end to an opposite end, the body comprising a natural resting position that includes a curve extending between the ends, the body being flexible such that the curve is configured to be at least partially unwound for wrapping the body around the wire, the body being resilient such that the body is configured to at least partially return to the natural resting position as the body is wrapped around the wire, and the body being free of an adhesive.

\* \* \* \* \*